US010096102B2

(12) United States Patent
Ray et al.

(10) Patent No.: US 10,096,102 B2
(45) Date of Patent: Oct. 9, 2018

(54) WIRE CONTACT INSPECTION

(71) Applicant: THE BOEING COMPANY, Chicago, IL (US)

(72) Inventors: Gary A. Ray, Issaquah, WA (US); Bradley J. Mitchell, Snohomish, WA (US); Bentley E. Northon, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/335,299

(22) Filed: Oct. 26, 2016

(65) Prior Publication Data

US 2018/0114303 A1    Apr. 26, 2018

(51) Int. Cl.
G06K 9/00    (2006.01)
G06T 7/00    (2017.01)
G06T 7/42    (2017.01)
G06T 7/90    (2017.01)

(52) U.S. Cl.
CPC ............ G06T 7/001 (2013.01); G06T 7/0004 (2013.01); G06T 7/0006 (2013.01); G06T 7/42 (2017.01); G06T 7/90 (2017.01); *G06T 2207/10024* (2013.01); *G06T 2207/20056* (2013.01); *G06T 2207/30136* (2013.01); *G06T 2207/30152* (2013.01)

(58) Field of Classification Search
CPC .................. G01B 11/303; G01N 21/57; G01N 2021/8887; G06T 11/001; G06T 7/401; G06T 7/001; G06T 7/0006; G06T 7/90
See application file for complete search history.

(56) References Cited

U.S. PATENT DOCUMENTS

| 3,761,182 A | | 9/1973 | Kubisiak et al. |
| 4,095,905 A | * | 6/1978 | Kuni ............... G01B 11/303 |
| | | | 250/559.11 |
| 4,262,987 A | * | 4/1981 | Gallusser ........... H01R 13/111 |
| | | | 439/744 |
| 5,050,093 A | | 9/1991 | Reddy et al. |
| 5,383,022 A | | 1/1995 | Kaser |
| 6,072,575 A | | 6/2000 | Loell |

(Continued)

FOREIGN PATENT DOCUMENTS

| EP | 1024377 A2 | 8/2000 |
| EP | 1271164 A1 | 1/2003 |

(Continued)

OTHER PUBLICATIONS

EP Extended Search Report for related application 16175756.2 dated Oct. 27, 2016, 7 pgs.

(Continued)

*Primary Examiner* — Amir Alavi
(74) *Attorney, Agent, or Firm* — Toler Law Group, P.C.

(57) ABSTRACT

A method of inspecting a wire contact includes determining, at a processor, a striation metric of a particular image of the wire contact. The particular image depicts an inspection hole in the wire contact. The method also includes comparing the striation metric to a wire-in-hole detection threshold and determining that a threshold number of visible wire strands are oriented along a particular axis in the inspection hole if the striation metric satisfies the wire-in-hole detection threshold.

22 Claims, 13 Drawing Sheets

(56) References Cited

U.S. PATENT DOCUMENTS

| | | | |
|---|---|---|---|
| 6,124,917 A * | 9/2000 | Fujioka | G02F 1/1339 349/138 |
| 6,842,258 B1 | 1/2005 | Leinvuo et al. | |
| 8,331,648 B2 | 12/2012 | Keeven et al. | |
| 2003/0007793 A1 | 1/2003 | Suzuki | |
| 2004/0207818 A1 | 10/2004 | Stahl | |
| 2004/0223053 A1 * | 11/2004 | Gladnick | G01N 21/8806 348/79 |
| 2008/0100928 A1 | 5/2008 | Wilson | |
| 2008/0266523 A1 | 10/2008 | Otsuka et al. | |
| 2010/0053790 A1 * | 3/2010 | Hayashi | G01N 21/95 360/31 |
| 2012/0188380 A1 * | 7/2012 | Drescher | G01N 21/8806 348/180 |
| 2013/0063591 A1 | 3/2013 | Bainbridge | |
| 2014/0036260 A1 | 2/2014 | Nygaard | |
| 2016/0203594 A1 | 7/2016 | Morard et al. | |
| 2016/0377555 A1 | 12/2016 | Ray et al. | |

FOREIGN PATENT DOCUMENTS

| | | |
|---|---|---|
| JP | 09015088 | 1/1997 |
| WO | 2016075607 A1 | 5/2016 |

OTHER PUBLICATIONS

Extended European Search Report for Application No. 17179862.2, dated Oct. 18, 2017, 6 pgs.

* cited by examiner

312

WIRE CONTACT INSPECTION

FIELD OF THE DISCLOSURE

The present disclosure relates to wire contact inspection.

BACKGROUND

A variety of different products include electrical wires that undergo a series of processing steps prior to installation. For example, some electrical wires are delivered in large spools, such that each portion of electrical wire is measured and cut, each end of the cut electrical wire is stripped and inserted into a specific wire contact, and each end is crimped to facilitate electrical contact with a lug, pin, or socket. One difficulty associated with the "strip and crimp" process described above is verifying the presence of wire strands in a wire contact. Generally, specially trained personnel visually inspect strip and crimp operations. For example, a technician may inspect different wire contacts to ensure electrical wires have been properly stripped and crimped with the wire contacts prior to product installation. The inspection is a time-consuming and laborious task because there are typically a large number of wire segments to be inspected.

SUMMARY

According to one implementation of the present disclosure, a method of inspecting a wire contact includes determining, at a processor, a striation metric of a particular image of the wire contact. The particular image depicts an inspection hole in the wire contact. The method also includes comparing the striation metric to a wire-in-hole detection threshold and determining that a threshold number of visible wire strands are oriented along a particular axis in the inspection hole if the striation metric satisfies the wire-in-hole detection threshold. This in turn verifies that the wire has been correctly stripped and crimped with the wire contact.

According to another implementation of the present disclosure, an apparatus for inspecting a wire contact includes striation metric determination circuitry configured to determine a striation metric of a particular image of the wire contact. The particular image depicts an inspection hole in the wire contact. The striation metric determination circuitry is coupled to comparison circuitry that is configured to compare the striation metric to a wire-in-hole detection threshold. The comparison circuitry is coupled to crimp inspection circuitry that is configured to determine that a threshold number of visible wire strands are oriented along a particular axis in the inspection hole if the striation metric satisfies the wire-in-hole detection threshold.

According to another implementation of the present disclosure, a non-transitory computer-readable medium includes instructions for inspecting a wire contact. The instructions, when executed by a processor, cause the processor to perform operations including determining a striation metric of a particular image of the wire contact. The particular image depicts an inspection hole in the wire contact. The operations also include comparing the striation metric to a wire-in-hole detection threshold. The operations further include determining that a threshold number of visible wire strands are oriented along a particular axis in the inspection hole if the striation metric satisfies the wire-in-hole detection threshold.

One advantage of the crimp inspection system of the present disclosure is using visual optics to automatically inspect strip and crimp operations which results in reduced inspection times. Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The FIGURES and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable a crimp inspection system to process images of a wire contact to determine whether a sufficient number of wire strands are present and oriented properly (and crimped) in the wire contact. For example, the crimp inspection system determines a striation metric of an image that depicts an inspection hole of the wire contact. Based on the striation metric, the crimp inspection system determines whether wire strands are present in the wire contact. For example, if the striation metric satisfies (e.g., is greater than) a wire-in-hole detection threshold, the crimp inspection system determines that one or more wire strands are present (and crimped) in the wire contact. If the wire strands are present in the wire contact, the wire contact may be used to electrically connect different components of an electrical product together (via the wire strands). If the striation metric fails to satisfy the wire-in-hole detection threshold, the crimp inspection system determines that there are no wire strands present in the wire contact, and the wire contact is rejected or subjected to additional inspections or tests.

Figure 1:
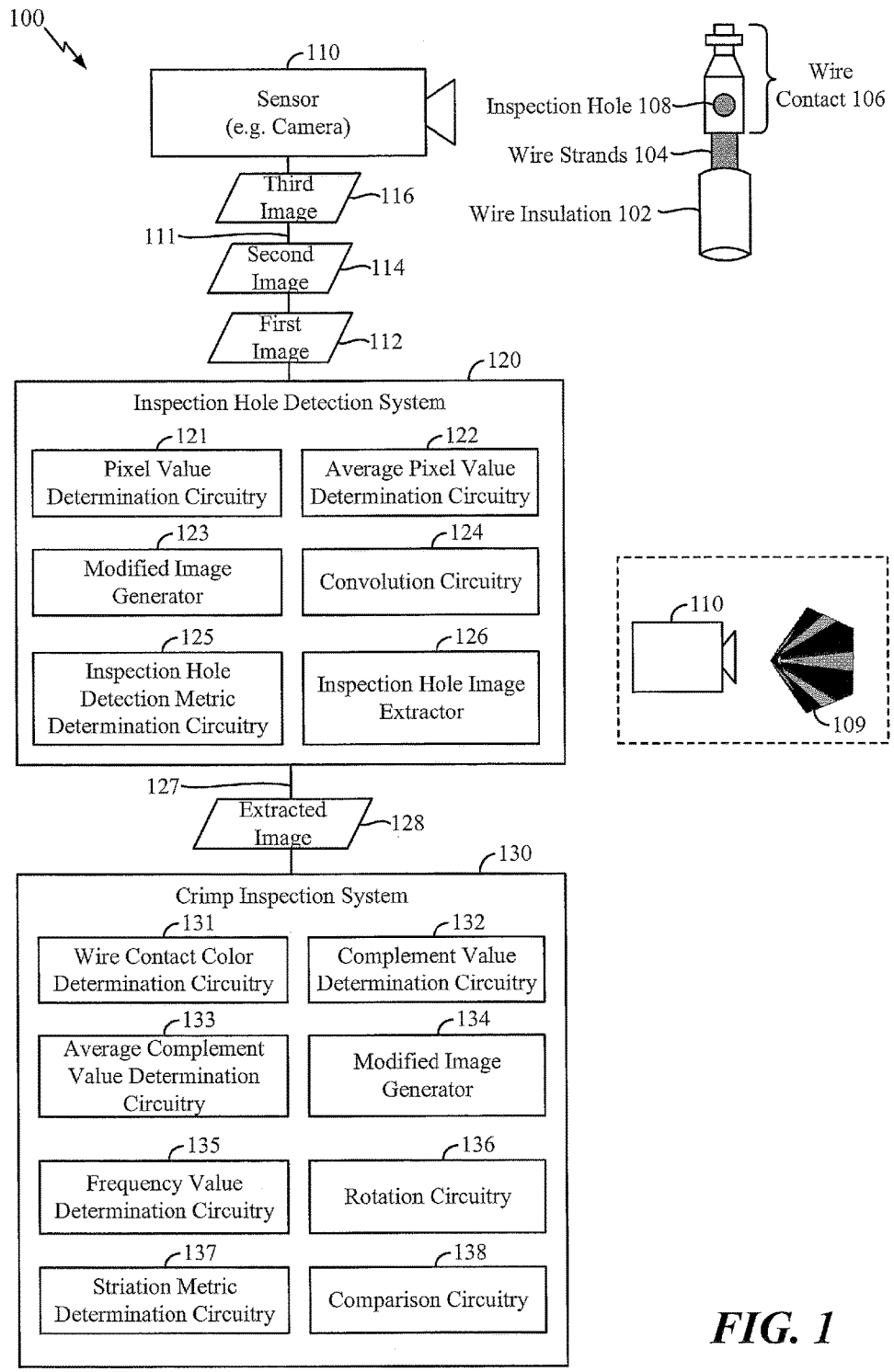
FIG. 1 is a diagram of a system that is operable to inspect a wire contact.

FIG. 1 is a diagram of a system 100 that is operable to inspect a wire contact. The system 100 includes a sensor 110, an inspection hole detection system 120, and a crimp inspection system 130. The sensor 110 is coupled to the inspection hole detection system 120 via a bus 111, and the inspection hole detection system 120 is coupled to the crimp inspection system 130 via a bus 127.

According to the techniques described herein, a wire undergoes a strip and crimp operation. In the example illustrated in FIG. 1, the wire includes wire insulation 102 that is cut and stripped to expose one or more wire strands 104. The one or more wire strands 104 are inserted and crimped into a wire contact 106. The wire contact 106 includes an inspection hole 108 that enables viewing the one or more wire strands 104 when the one or more wire strands 104 are inserted and crimped into the wire contact 106.

The inspection hole detection system 120 includes pixel value determination circuitry 121, average pixel value determination circuitry 122, a modified image generator 123, convolution circuitry 124, inspection hole detection metric determination circuitry 125, and an inspection hole image extractor 126. In other implementations, the inspection hole detection system 120 includes additional (or fewer) components. In yet other implementations, two or more components within the inspection hole detection system 120 are combined into a single component. The inspection hole detection system 120 is configured to determine a location of the inspection hole 108. However, if the location of the inspection hole 108 is known, operations with respect to the inspection hole detection system 120 may be bypassed.

The crimp inspection system 130 includes wire contact color determination circuitry 131, complement value determination circuitry 132, average complement value determination circuitry 133, a modified image generator 134, frequency value determination circuitry 135, rotation circuitry 136, striation metric determination circuitry 137, and comparison circuitry 138. In other implementations, the crimp inspection system 130 includes additional (or fewer) components. In yet other implementations, two or more components within the crimp inspection system 130 are combined into a single component.

According to one implementation, the sensor 110 is a camera configured to capture an image of the wire contact 106. In the example illustrated in FIG. 1, the sensor 110 captures a first image 112 of the wire contact 106 at a first time, captures a second image 114 of the wire contact 106 at a second time, and captures a third image 116 of the wire contact 106 at a third time. Each image 112, 114, 116 captures the wire contact 106 from a different angle. As a non-limiting example, the first image 112 captures the wire contact 106 from a substantially direct point-of-view (e.g., within 30 degrees of a direct point-of-view) of the inspection hole 108. The second image 114 captures the wire contact 106 from a point-of-view that is approximately 60 degrees from a direct point-of-view of the inspection hole 108, and the third image 116 captures the wire contact 106 from a point-of-view that is approximately 90 degrees from a direct point-of-view of the inspection hole 108. Although the sensor 110 is shown to capture three images 112, 114, 116, in other implementations, the sensor 110 captures additional images (e.g., between five and seven images) of the wire contact 106 to ensure that an adequate number of angles are captured. As a non-limiting example, the sensor 110 rotates 360 degrees around the wire contact 106 and captures multiple images of the wire contact 106 from different angles during rotation. According to one implementation, if there is information available to the system 100 with respect to the location of the inspection hole 108, the sensor 110 rotates around the location of the inspection hole (as opposed to rotating completely around the wire contact 106).

Although the sensor 110 is described as rotating around the wire contact 106, in other implementations, the wire contact 106 moves (e.g., rotates) and the sensor 110 captures images of the wire contact 106 at different angles based on the rotation of the wire contact 106. According to another implementation, the sensor 110 and the wire contact 106 rotate to facilitate the capture of images at different angles. According to another implementation, two or more sensors are used to capture images of the wire contact 106 at different angles. According to another implementation, a mirror 109 is used with the sensor 110 to capture a single image that depicts the entire (or substantially the entire) wire contact 106.

In the example illustrated in FIG. 1, each image 112, 114, 116 is provided to the inspection hole detection system 120 via the bus 111. The inspection hole detection system 120 is configured to process each image 112, 114, 116 to detect whether an image captures at least a portion of the inspection hole 108. Upon determining that an image captures a least a portion of the inspection hole 108, the inspection hole detection system 120 extracts the portion of the image and provides the extracted portion of the image to the crimp inspection system 130 via the bus 127. For ease of illustration, operations of the inspection hole detection system 120 are described with respect to the first image 112.

Figure 2:
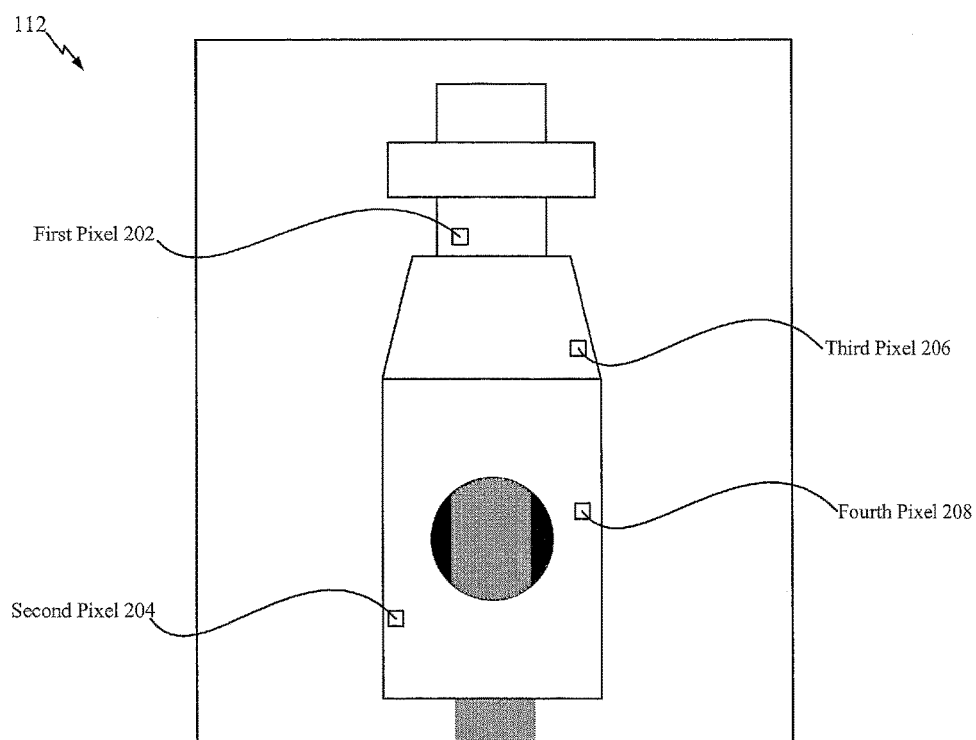
FIG. 2 depicts an image of a wire contact.

In the example illustrated in FIG. 1, the pixel value determination circuitry 121 is configured to determine pixel values of each pixel of the wire contact 106 in the first image 112. To illustrate, a non-limiting example of the first image 112 is shown in greater detail in FIG. 2. The pixel value determination circuitry 121 determines a first pixel value associated with a first pixel 202 of the wire contact 106, a second pixel value associated with a second pixel 204 of the wire contact 106, a third pixel value associated with a third pixel 206 of the wire contact 106, a fourth pixel value associated with a fourth pixel 208 of the wire contact 106, etc. Although only four pixels 202, 204, 206, 208 of the wire contact 106 are emphasized in the first image 112, it should be understood that the first image 112 includes additional pixels of the wire contact 106 and the pixel value determination circuitry 121 determines pixel values for each additional pixel (or for a plurality of the additional pixels). Each pixel value may be expressed as an intensity value, a red-green-blue (RGB) value, or a value of another color space. If the pixel value is expressed as a RGB value, the pixel value may be the R-pixel value, the G-pixel value, the B-pixel value, or a combination thereof.

Figure 3:
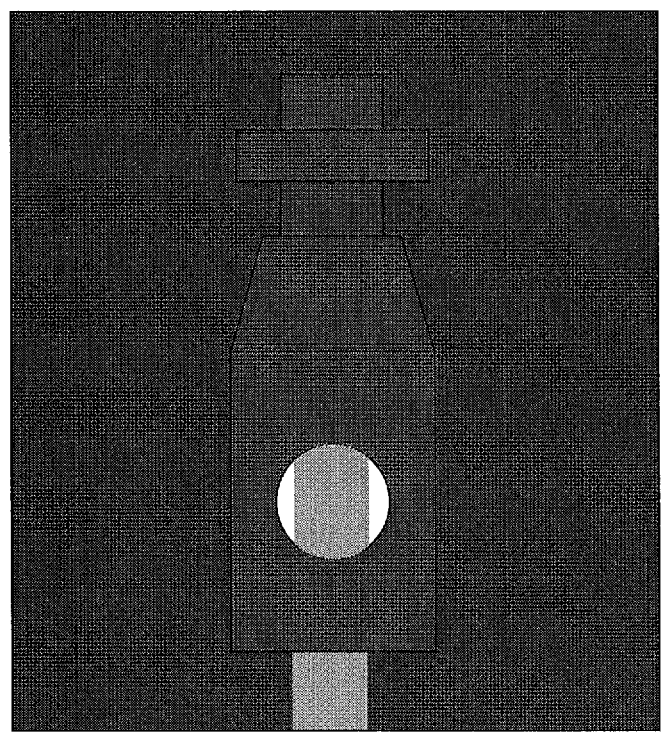
FIG. 3 is a modified image used by an inspection hole detection system to locate an inspection hole of a wire contact.

In the example illustrated in FIG. 1, the average pixel value determination circuitry 122 is configured to determine an average pixel value (e.g., a mean pixel value) of the pixel values determined by the pixel value determination circuitry 121. For example, the average pixel value determination circuitry 122 is configured to determine an average of the first pixel value, the second pixel value, the third pixel value, and the fourth pixel value. The average pixel value is provided to the modified image generator 123. In the example illustrated in FIG. 1, the modified image generator 123 is configured to subtract the average pixel value from each pixel value in the first image 112 to generate a first modified image 312. Subtracting the average pixel value from each pixel value in the first image 112 substantially reduces (e.g., "darkens") or reduces the contrast of areas in the first image 112 not associated with the inspection hole 108. A non-limiting example of the first modified image 312 is shown in FIG. 3.

According to another implementation, color planes corresponding to the color of the wire contact 106 (as opposed to the color of the wire) are summed together using contact color weighting. The color planes are determined by accessing a database (not shown) storing color information for different wire contacts. The average of a two-dimensional array of the summed color planes is subtracted from each pixel in the first image 112 to generate the first modified image 312. Subtracting the average of the two-dimensional array from each pixel value in the first image 112 substantially reduces (e.g., "darkens") or reduces the contrast of areas in the first image 112 not associated with the inspection hole 108.

Figure 4:
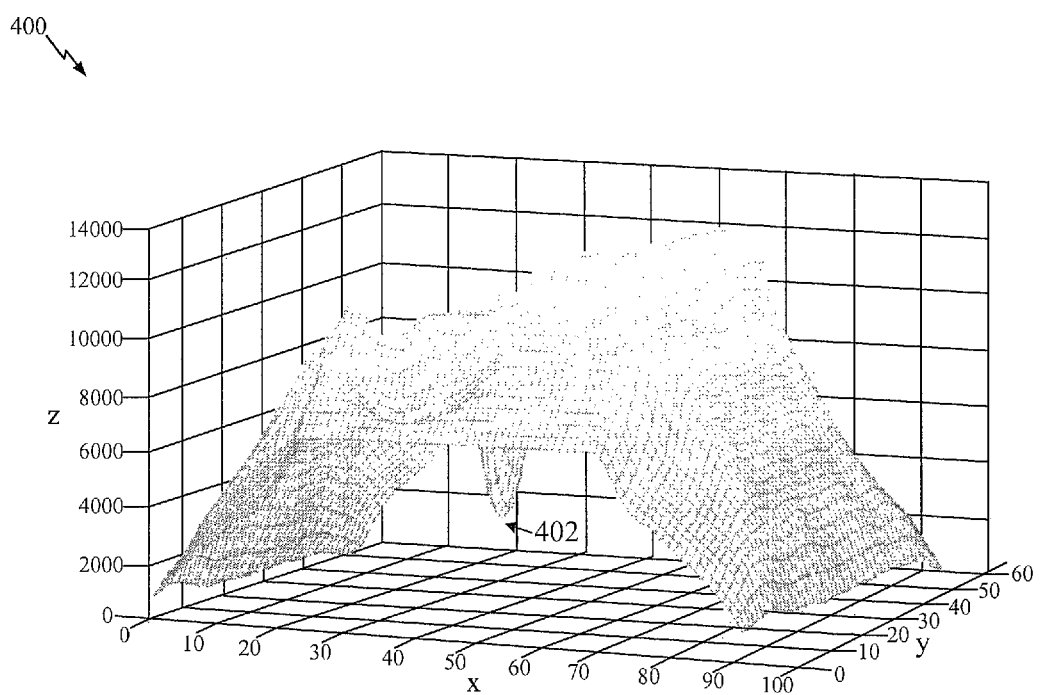
FIG. 4 depicts a convolution chart used by an inspection hole detection system to determine an inspection hole detection metric.

The first modified image 312 is provided to the convolution circuitry 124. In the example illustrated in FIG. 1, the convolution circuitry 124 performs a convolution operation on the first modified image 312 and on a circular ring having a particular radius. For example, the convolution circuitry 124 generates the circular ring as a black and white image. The particular radius corresponds to a radius of an inspection hole. The convolution circuitry 124 convolves the circular ring with the first modified image to determine a center location of the inspection hole 108. To illustrate, a resulting convolution chart 400 of the convolution operation is shown in FIG. 4. The x-axis and the y-axis of the convolution chart 400 indicate locations of the first image 112 (or locations of the first modified image 312). The z-axis of the convolution chart 400 indicates values of the convolution operation at different locations of the first image 112.

In the example illustrated in FIG. 1, the inspection hole detection metric determination circuitry 125 is configured to determine an inspection hole detection metric based on a minimum value 402 of the convolution operation. The minimum value 402 indicates the location of the center of the inspection hole 108 in the first image 112. For example, the inspection hole detection metric determination circuitry 125 determines that the minimum value 402 of the convolution chart 400 corresponds to particular location (e.g., the x-coordinate (39) and the y-coordinate (35)) of the first image 112. As a result, the particular location is quantized as the inspection hole detection metric, and the inspection hole detection metric is provided to the inspection hole image extractor 126.

Figure 5:
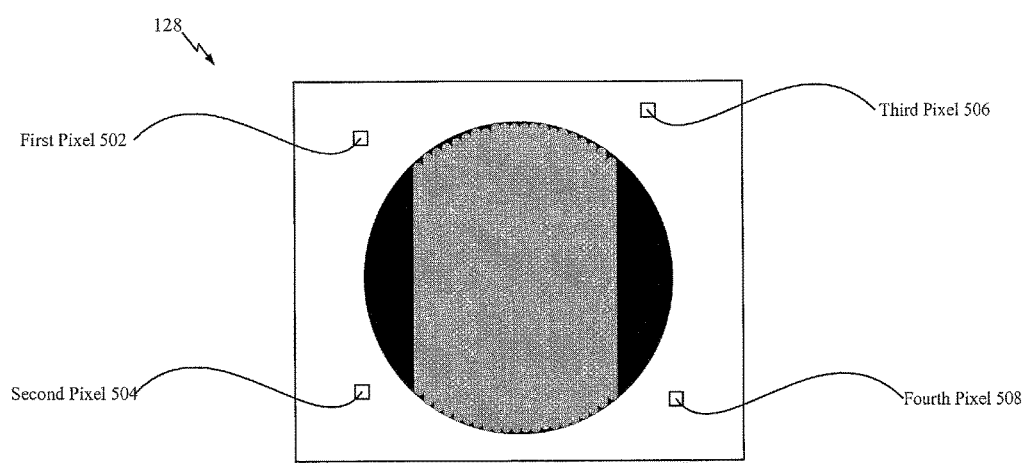
FIG. 5 is an extracted image of an inspection hole of a wire contact.

In the example illustrated in FIG. 1, the inspection hole image extractor 126 is configured to extract a portion of the first image 112 based on the inspection hole detection metric to generate an extracted image 128. For example, because the inspection hole detection metric indicates the location of the center of the inspection hole 108, the inspection hole image extractor 126 extracts a portion (e.g., a window surrounding the location of center of the inspection hole 108) of the first image 112 to generate the extracted image 128. An example of the extracted image 128 is shown in greater detail with respect to FIG. 5. The inspection hole image extractor 126 provides the extracted image 128 to the crimp inspection system 130 via the bus 127.

If an image that does not have a view of the inspection hole 108 is provided to the inspection hole detection system 120, the inspection hole detection system 120 bypasses extracting a portion of the image and providing the extracted portion to the crimp inspection system 130. In the example illustrated in FIG. 1, the inspection hole detection system 120 extracts portions of images that depict the inspection hole 108 and provides those images to the crimp inspection system 130 and discards images that do not depict the inspection hole 108.

In the example illustrated in FIG. 1, the crimp inspection system 130 is configured to determine a striation metric of the extracted image 128 and to determine whether a threshold number of visible wire strands 104 are oriented along a particular axis in the inspection hole 108 of the wire contact 106 based on the striation metric. Because the extracted image 128 is generated based on the inspection hole detection metric, the extracted image 128 depicts the inspection hole 108 of the wire contact 106.

In the example illustrated in FIG. 1, the wire contact color determination circuitry 131 is configured to determine pixel values for the wire contact 106 in the extracted image 128. For example, the wire contact color determination circuitry 131 determines a first pixel value associated with a first pixel 502 of the wire contact 106, a second pixel value associated with a second pixel 504 of the wire contact 106, a third pixel value associated with a third pixel 506 of the wire contact 106, a fourth pixel value associated with a fourth pixel 508 of the wire contact 106, etc. Although only four pixels 502, 504, 506, 508 of the wire contact 106 are emphasized in the extracted image 128, it should be understood that the extracted image 128 may include additional pixels of the wire contact 106 and the wire contact color determination circuitry 131 may determine pixel values for each additional pixel (or for a plurality of the additional pixels). Each pixel value may be expressed as an intensity value, a RGB value, or a value of another color space. If the pixel value is expressed as a RGB value, the pixel value may be the R-pixel value, the G-pixel value, the B-pixel value, or a combination thereof.

In the example illustrated in FIG. 1, the complement value determination circuitry 132 is configured to determine complement values of each contact color in the extracted image 128. As a non-limiting example, if the wire contact color determination circuitry 131 determines that the first pixel value associated with the first pixel 502 is (1, 0.9, 0.1), the complement value determination circuitry 132 determines the complement of the first pixel value by subtracting each RGB value from "one". The resulting complement value of the first pixel would be (0, 0.1, 0.9). Thus, the red-complement value of the first pixel 502 is "0", the green-complement value of the first pixel 502 is "0.1", and the blue-complement value of the first pixel 502 is "0.9". After determining the complement values of each pixel of the wire contact 106 in the extracted image 128, the complement value determination circuitry 132 provides the complement values to the average complement value determination circuitry 133.

In the example illustrated in FIG. 1, the average complement value determination circuitry 133 is configured to determine an average complement value (R*, G*, B*) for the wire contact pixels in the extracted image 128. For example, the average complement value determination circuitry 133 determines the sum for each red-complement value of the wire contact pixels in the extracted image 128, the sum for each green-complement value of the wire contact pixels in the extracted image 128, and the sum for each blue-complement value of the wire contact pixels in the extracted image 128. The sum of the red-complement values is divided by the number of wire contact pixels to generate the average red-complement value (R*), the sum of the green-complement values is divided by the number of wire contact pixels to generate the average green-complement value (G*), and the sum of the blue-complement values is divided by the number of wire contact pixels to generate the average blue complement-value (B*). The average complement value (R*, G*, B*) is provided to the modified image generator 134.

Figure 6:
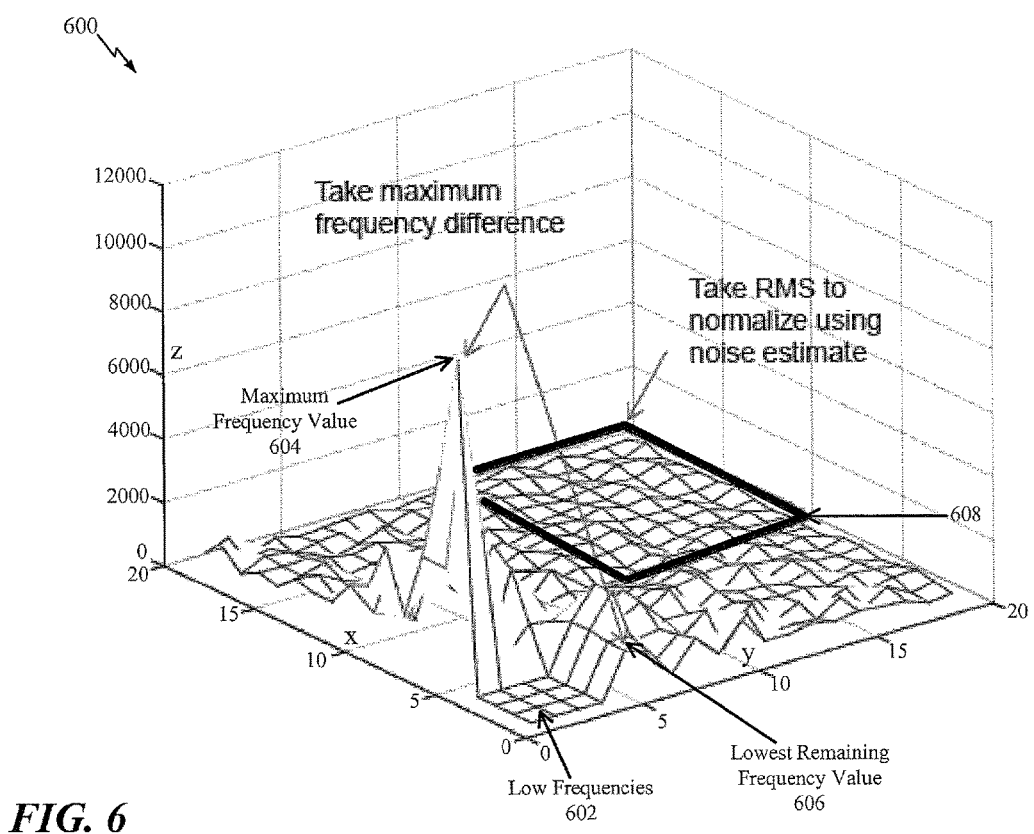
FIG. 6 depicts a graph used by a crimp inspection system to determine a striation metric.

In the example illustrated in FIG. 1, the modified image generator 134 is configured to subtract the average complement value (R*, G*, B*) from each pixel in the extracted image 128 to generate a modified image (not shown). The frequency value determination circuitry 135 is configured to determine frequency values for each pixel of the modified image by computing an absolute value of a two-dimensional (2D) transform operation performed on the modified image. According to one implementation, the transform operation includes a Fast Fourier Transform (FFT) operation. A graph 600 depicting resulting frequencies from the absolute value of the transform operation is shown in FIG. 6. The x-axis and the y-axis of the graph 600 indicate locations of the extracted image 128. The z-axis of the graph 600 indicates frequency values at different locations of the extracted image 128.

In the example illustrated in FIG. 1, the striation metric determination circuitry 137 is configured to determine a striation metric based at least on a maximum frequency value of the frequency values. The striation metric is used to verify the presence or absence of properly oriented wires in the inspection hole 108. Thus, the striation metric may indicate whether the strip and crimp of the wire contact 106 has been properly performed. In order to determine the striation metric, the striation metric determination circuitry 137 sets the low frequencies to zero values. To illustrate, low frequencies 602 in the graph 600 are set to zero (e.g., the frequencies associated with pixels (1,4) and (4,1) are set to zero). The low frequencies 602 are any frequencies that fail to satisfy a threshold frequency. After setting the low frequencies to zero values, the striation metric determination circuitry 137 determines the difference between a maximum frequency value 604 and a lowest remaining frequency value 606. The striation metric determination circuitry 137 also identifies a particular portion of pixels in the extracted image 128 that have the highest frequency values. To illustrate with respect to FIG. 6, a portion 608 (e.g., a quarter) of the graph 600 is identified as the high frequency quarter. The striation determination circuitry 137 determines a root mean square of the frequency values in the portion 608 and divides the difference by the root mean square to determine the striation metric. According to some implementations, the maximum frequency value 604 is divided by the root mean square to determine the striation metric. According to one implementation, the rotation circuitry 136 is configured to rotate the extracted image 128 to align a direction of a potential wire strand in the inspection hole 108 with an image axis. For example, the rotation circuitry 136 rotates the extracted image 128 at different angles for 180 degrees and determines the striation metric at each angle. The angle that results in the largest striation metric is used for comparison, as described below.

The frequency metric (e.g., the frequencies in the graph 600) corresponds to the sinusoidal coloration of the image in the inspection hole 108. As a non-limiting example, the frequency metric indicates that the image depicts a set of parallel wires. If the wires are twisted, if there are not enough wires, or if there are missing wire strands, a drop in the frequency amplitude occurs. To illustrate, the frequencies correspond to the separation between wire strands. If the separation is too close or too far, this indicates non-parallel wires. High frequencies indicate the separation is too close, and low frequencies indicate the separation is too far. As described above, the striation metric determination circuitry 137 eliminates the lowest frequency values and uses the high frequency values as an estimate of noise. This noise is used in a ratio between the highest value and the noise value to estimate the signal to noise ratio of the presence of parallel wires. This becomes the striation metric.

In the example illustrated in FIG. 1, the comparison circuitry 138 is configured to compare the striation metric to a wire-in-hole detection threshold. If the striation metric satisfies (e.g., is greater than) the wire-in-hole detection threshold, the crimp inspection system 130 determines that a threshold number of visible wire strands 104 are oriented along a particular axis in the inspection hole 108. As a result, the crimp inspection system 130 determines that the wire is crimped into the wire contact 106 and generates a notice indicating that the wire is crimped into the wire contact 106. Upon detection of the notice, the wire and the wire contact 106 are installed in an electrical product.

Figure 7:
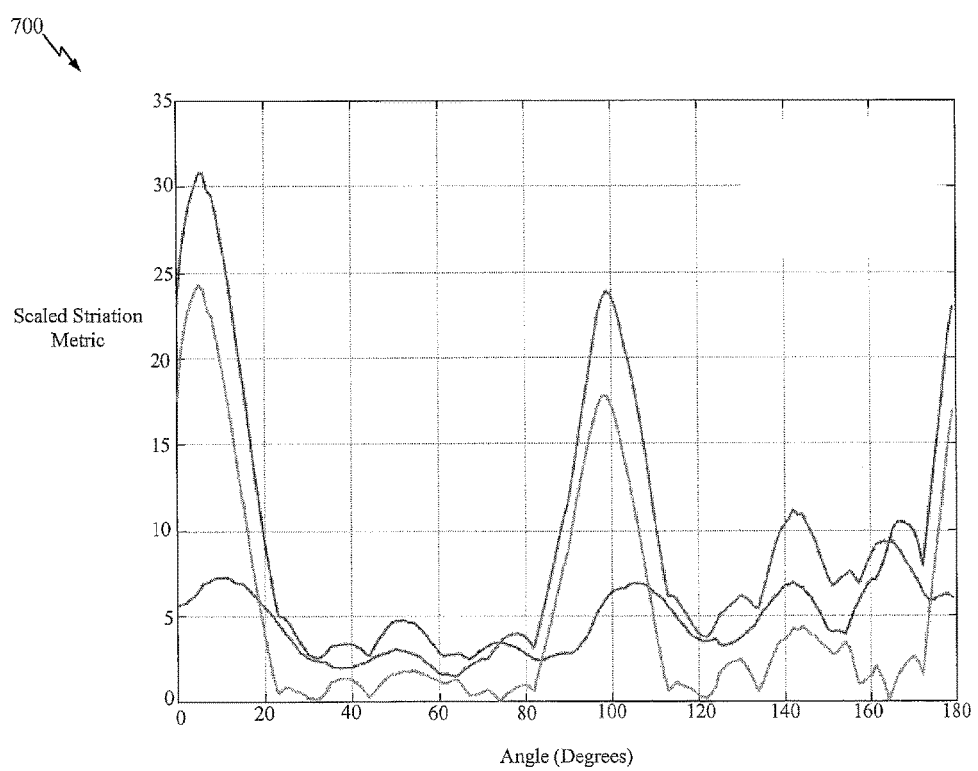
FIG. 7 is a chart illustrating striation metrics at different hole rotation angles.

The inspection techniques described above may also be applied to the other images 114, 116. As a non-limiting example, the inspection hole detection system 120 and the crimp inspection system 130 apply the techniques described above to the other images 114, 116 to determine a striation metric for the second image 114 and a striation metric for the third image 116. Thus, striation metrics are determined for images captured at different points-of-view (e.g., different angles). For example, referring to FIG. 7, a non-limiting example of a chart 700 illustrating striation metrics at different hole rotation angles is shown. According to the chart 700, different angles (with respect to the inspection hole 108) result in different striation metrics.

Figure 8:
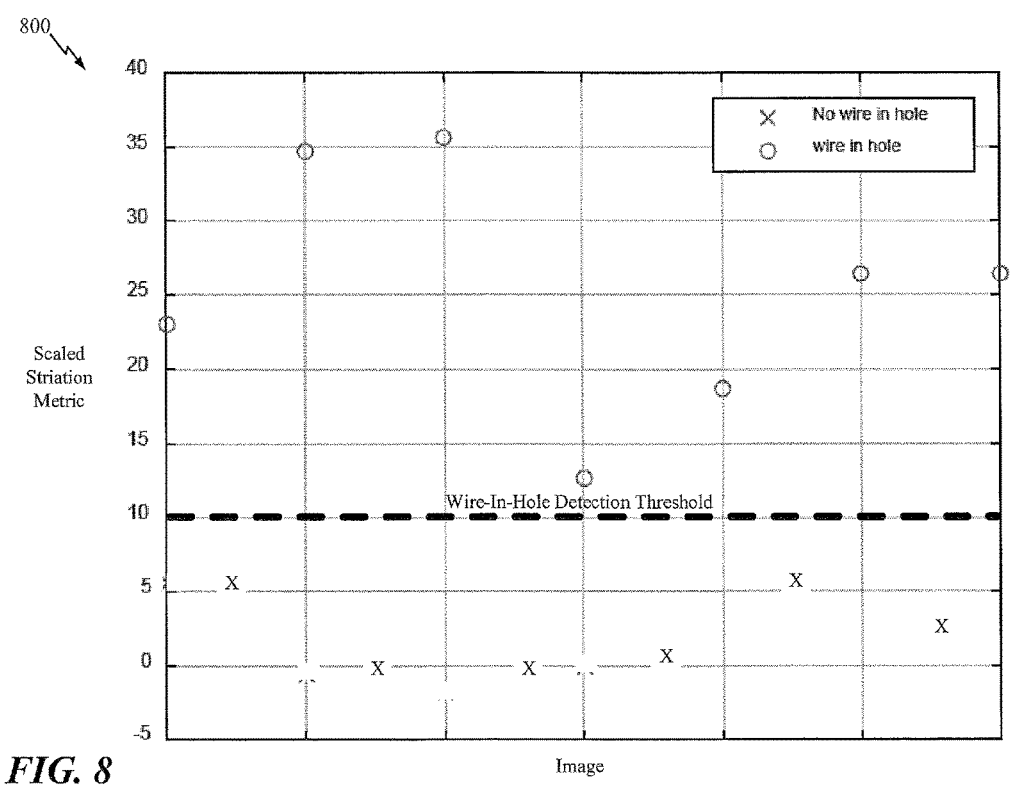
FIG. 8 is a chart depicting a comparison between striation metrics and a wire-in-hole detection threshold.

Referring to FIG. 8, a chart 800 depicting several striation metrics and a wire-in-hole detection threshold is shown. According to the chart 800, the wire-in-hole detection threshold is set at ten. If the striation metric for a particular image is below the wire-in-hole detection threshold, the crimp inspection system 130 determines that fewer than the threshold number of visible wire strands 104 are oriented along a particular axis in the inspection hole 108 of a wire contact 106. If the striation metric for a particular image (e.g., an image with the largest striation metric) is above the wire-in-hole detection threshold, the crimp inspection system 130 determines that a threshold number of visible wire strands 104 are oriented along the particular axis in the inspection hole 108 of the wire contact 106.

The techniques described with respect to FIGS. 1-8 reduce manual labor associated with inspecting wire contacts, such as the wire contact 106, for crimped wires. For example, visual optics (e.g., images) of the wire contact 106 are used in conjunction with a striation-based detection algorithm for automated crimp inspections. As a result, a relatively large number of wire contacts are inspected within a relatively short amount of time with decreased manual labor.

Figure 9:
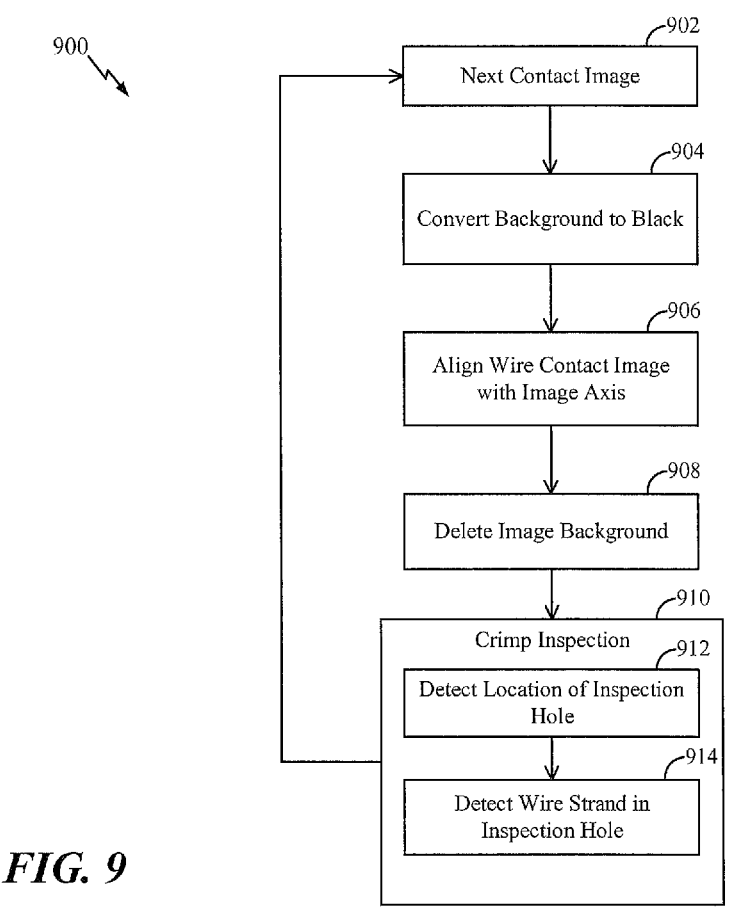
FIG. 9 is a process diagram for inspecting a wire contact.

Referring to FIG. 9, a process diagram 900 for inspecting a wire contact is shown. The techniques described with respect to the process diagram 900 may be performed by the one or more components of the system 100 of FIG. 1.

At 902, the inspection hole detection system 120 loops over contact images (e.g., select a next contact image from captured images of the sensor 110). For example, the inspection hole detection system 120 selects the first image 112 from the images 112, 114, 116 of the wire contact 106 captured by the sensor 110. At 904, the inspection hole detection system 120 converts the background to black. For example, the inspection hole detection system 120 converts the background of the first image 112 to black (e.g., converts the RGB values of background pixels to approximately (0,0,0)).

At 906, the inspection hole detection system 120 aligns a wire contact image with an image axis. For example, the inspection hole detection system 120 aligns the wire contact 106 in the first image 112 with an image axis. Aligning the wire contact 106 in the first image with the image axis includes rotating the first image 112 such that the edge of the wire contact 106 is substantially parallel with the image axis. At 908, the inspection hole detection system 120 deletes the image background. For example, the inspection hole detection system 120 deletes the pixels having black (or substantially black) pixel values to isolate the wire contact 106.

Crimp inspection is performed, at 910. For example, the inspection hole detection system 120 detects a location of an inspection hole, at 912. To illustrate, the inspection hole detection metric determination circuitry 125 determines the inspection hole detection metric (e.g., a metric that indicates a center of the inspection hole 108). After the inspection hole detection metric is determined, the inspection hole image extractor 126 extracts a portion of the first image 112 surrounding the location indicated by the inspection hole detection metric. At 914, the crimp inspection system 130 detects one or more wire strands in the inspection hole. For example, the crimp inspection system 130 detects whether a threshold number of visible wire strands 104 are oriented along a particular axis in the inspection hole 108 of the wire contact 106.

The process diagram 900 of FIG. 9 reduces manual labor associated with inspecting wire contacts, such as the wire contact 106, for crimped wires. For example, visual optics (e.g., images) of the wire contact 106 are used in conjunction with a striation-based detection algorithm for automated crimp inspections. As a result, a relatively large number of wire contacts are inspected within a relatively short amount of time with decreased manual labor.

Figure 10:
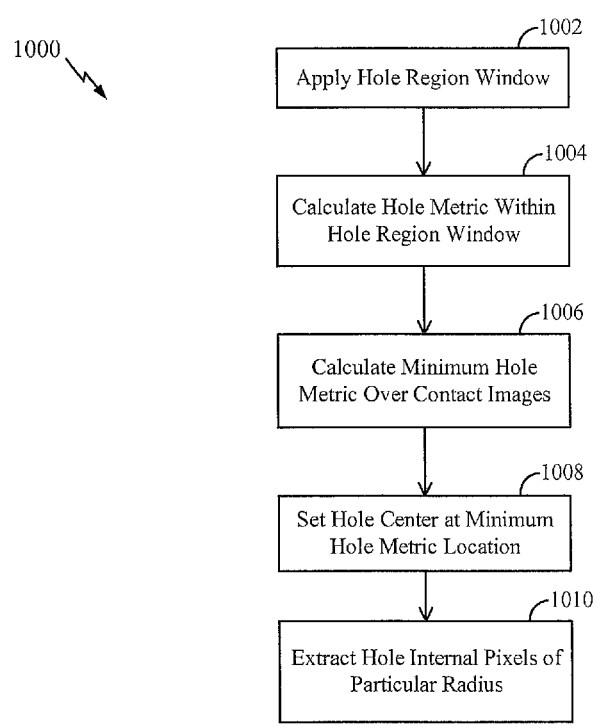
FIG. 10 is a method for extracting pixels associated with an inspection hole of a wire contact from an image.

Referring to FIG. 10, a method 1000 for extracting pixels associated with an inspection hole of a wire contact from an image. The method 1000 may be performed by the inspection hole detection system 120 of FIG. 1.

The method 1000 includes applying a hole region window to an image, at 1002. For example, referring to FIG. 1, the inspection hole detection system 120 applies a window to the first image 112. As used herein, "applying a window" to an image includes focusing on a particular portion (defined by a boundary of the window) of the image and discarding other portions of the image. At least one portion of the inspection hole 108 is depicted in the window. At 1004, the inspection hole detection system 120 calculates a hole metric within the hole region window. For example, referring to FIG. 1, the inspection hole detection metric determination circuitry 125 determines the inspection hole detection metric in a similar manner as described above.

At 1006, the inspection hole detection system 120 calculates a minimum hole metric over the contact images, at 1006. For example, the inspection hole detection metric determination circuitry 125 determines the inspection hole detection metric based on the minimum value 402 of the convolution operation in a similar manner as described above. At 1008, the inspection hole detection system 120 sets the hole center at the minimum hole metric location. For example, referring to FIG. 4, the minimum value 402 indicates the location of the center of the inspection hole 108 in the first image 112. For example, the inspection hole detection metric determination circuitry 125 determines that the minimum value 402 of the convolution chart 400 corresponds to particular location (e.g., the x-coordinate (39) and the y-coordinate (35)) of the first image 112. Thus, the particular location is quantized as the inspection hole detection metric.

At 1010, the inspection hole detection system 120 extracts hole internal pixels of a particular radius. For example, referring to FIG. 1, the inspection hole image extractor 126 extracts a portion of the first image 112 based on the inspection hole detection metric to generate the extracted image 128. The portion is a circular portion of the particular radius (e.g., a common radius for an inspection hole). Because the inspection hole detection metric indicates the location of the center of the inspection hole 108, the inspection hole image extractor 126 extracts a portion (that has a window surrounding the location of center of the inspection hole 108) of the first image 112 to generate the extracted image 128.

The method 1000 of FIG. 10 enables the inspection hole 108 to be isolated from other portions of the first image 112 such that crimp inspection is performed. For example, after the inspection hole 108 is isolated (e.g., extracted) from the other portions of the first image, the crimp inspection system 130 determines the striation metric and also determines whether a threshold number of visible wire strands 104 are oriented along a particular axis in the inspection hole 108 based on the striation metric.

Figure 11:
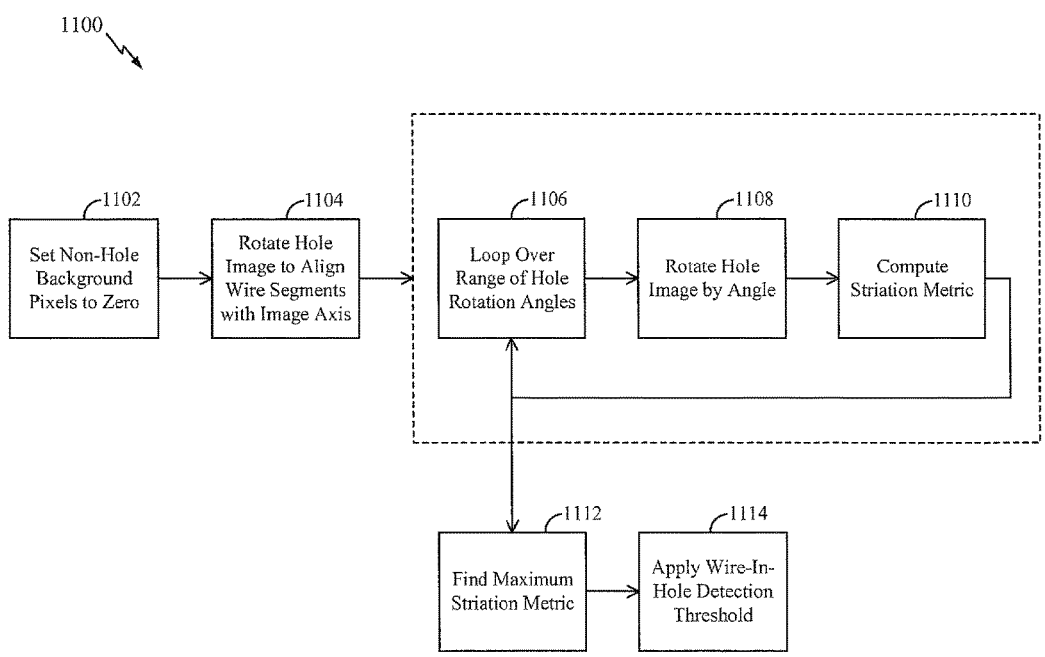
FIG. 11 is a process diagram for inspecting a wire contact.

Referring to FIG. 11, a process diagram 1100 for inspecting a wire contact is shown. The techniques described with respect to the process diagram 1100 may be performed by the one or more components of the system 100 of FIG. 1, such as the crimp inspection system 130.

At 1102, the crimp inspection system 1102 sets non-hole background pixels to zero. For example, referring to FIG. 1, the crimp inspection system 130 sets pixels in the extracted image 128 that do not represent portions of the inspection hole 108 to zero pixel values. The crimp inspection system 130 determines a color the of the wire contact 106 from a database of wire contact colors. Pixels that do not represent colors in the database are set to zero pixel values. At 1104, the crimp inspection system 130 rotates the hole image to align wire segments with an image axis. For example, referring to FIG. 1, the rotation circuitry 136 rotates the extracted image 128 to align a direction of a potential wire strand in the inspection hole 108 with an image axis.

At 1106, the crimp inspection system 130 loops over a range of hole rotation angles. For each rotation angle, the rotation circuitry 1108 rotates the image to align a direction of a potential wire strand in the inspection hole with the image axis, at 1108. The crimp inspection system 130 computes the striation metric for each image, at 1110. For example, the crimp inspection system 130 computes the summed complement of contact colors for the hole image and then subtracts the mean of the summed complement for the image to generate a resulting image. The crimp inspection system 130 also computes the absolute value of the 2D FFT of the resulting image, zero the low frequencies (e.g., frequencies that fail to satisfy a threshold), and determine the difference between the maximum frequency content and the lowest remaining frequency value. The crimp inspection system 130 divides the difference by the root mean square of the highest frequency quarter to determine the striation metric. After the striation metric for each rotation angle has been computed, the crimp inspection system 130 finds the maximum striation metric, at 1112. The crimp inspection system 130 applies the wire-in-hole detection threshold to the maximum striation metric to determine whether a threshold number of visible wire strands 104 are oriented along a particular axis in the inspection hole 108. For example, if the maximum striation metric is greater than the wire-in-hole detection threshold, the crimp inspection system 130 determines that a threshold number of visible wire strands 104 are oriented along a particular axis in the inspection hole 108.

The process diagram 1100 of FIG. 11 reduces manual labor associated with inspecting wire contacts, such as the wire contact 106, for crimped wires. For example, by determining the striation metric, the crimp inspection system 130 determines whether a wire is crimped with the wire contact 106 using an automated process. As a result, a relatively large number of wire contacts are inspected within a relatively short amount of time with decreased manual labor.

Figure 12:
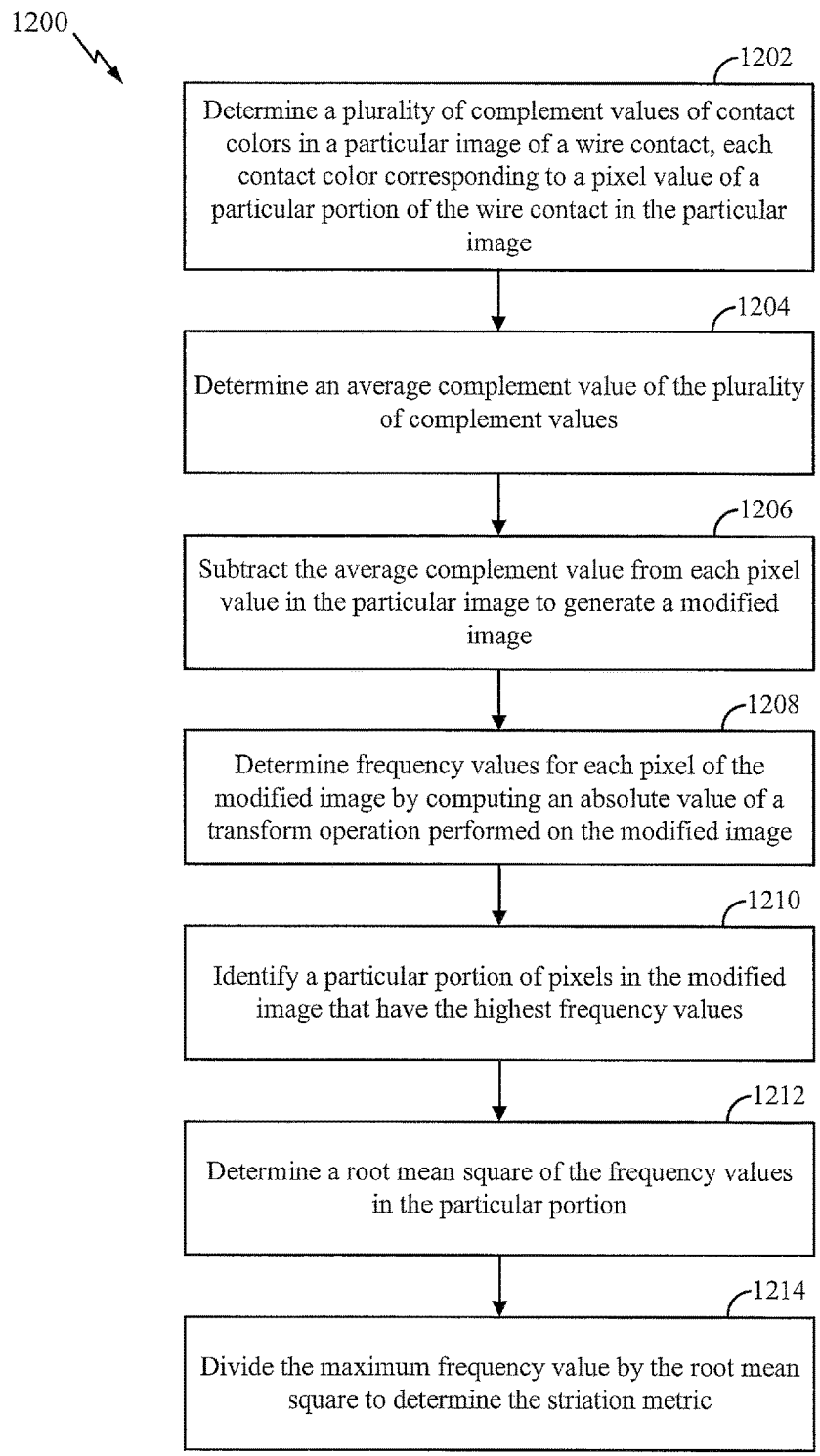
FIG. 12 is a method for determining a striation metric of a particular image of a wire contact.

Referring to FIG. 12, a method 1200 for determining a striation metric of a particular image of a wire contact is shown. The method 1200 may be performed by the crimp inspection system 130 of FIG. 1.

The method 1200 includes determining a plurality of complement values of contact colors in a particular image of a wire contact, at 1202. Each contact color corresponds to a pixel value of a particular portion of the wire contact in the particular image. For example, referring to FIG. 1, the wire contact color determination circuitry 131 determines pixel values for the wire contact 106 in the extracted image 128 (e.g., the "particular image" according to the method 1200). To illustrate, the wire contact color determination circuitry 131 determines the first pixel value associated with the first pixel 502 of the wire contact 106, the second pixel value associated with the second pixel 504 of the wire contact 106, the third pixel value associated with the third pixel 506 of the wire contact 106, the fourth pixel value associated with the fourth pixel 508 of the wire contact 106, etc. The complement value determination circuitry 132 determines complement values of each contact color in the extracted image 128. As a non-limiting example, if the wire contact color determination circuitry 131 determines that the first pixel value associated with the first pixel 502 is (1, 0.9, 0.1), the complement value determination circuitry 132 determines the complement of the first pixel value by subtracting each RGB value from "one". The resulting complement value of the first pixel would be (0, 0.1, 0.9).

The method 1200 also includes determining an average complement value of the plurality of complement values, at 1204. For example, referring to FIG. 1, the average complement value determination circuitry 133 determines the average complement value (R*, G*, B*) for the wire contact pixels in the extracted image 128. For example, the average complement value determination circuitry 133 determines the sum for each red-complement value of the wire contact pixels in the extracted image 128, the sum for each green-complement value of the wire contact pixels in the extracted image 128, and the sum for each blue-complement value of the wire contact pixels in the extracted image 128. The sum of the red-complement values is divided by the number of wire contact pixels to generate the average red-complement value (R*), the sum of the green-complement values is divided by the number of wire contact pixels to generate the average green-complement value (G*), and the sum of the blue-complement values is divided by the number of wire contact pixels to generate the average blue complement-value (B*).

The method 1200 also includes subtracting the average complement value from each pixel value in the particular image to generate a modified image, at 1206. For example, referring to FIG. 1, the modified image generator 134 subtracts the average complement value (R*, G*, B*) from each pixel in the extracted image 128 to generate the modified image. The method 1200 also includes determining frequency value for each pixel of the modified image by computing an absolute value of a transform operation performed on the modified image, at 1208. For example, referring to FIG. 1, the frequency value determination circuitry 135 is configured to determine frequency values for each pixel of the modified image by computing the absolute value of a 2D transform operation performed on the modified image. According to one implementation, the transform operation includes a Fast Fourier Transform (FFT) operation.

The method 1200 also includes identifying a particular portion of pixels in the modified image that have the highest frequency values, at 1210. For example, referring to FIG. 1, the striation metric determination circuitry 137 identifies the particular portion of pixels in the extracted image 128 that have the highest frequency values. To illustrate, the portion 608 (e.g., a quarter) of the graph 600 is identified as the high frequency quarter. The method 1200 also includes determining a root mean square of the frequency values in the particular portion, at 1212, and dividing the maximum frequency value by the root mean square to determine the striation metric, at 1214. For example, referring to FIG. 1, the striation determination circuitry 137 determines a root mean square of the frequency values in the portion 608 and divides the difference (between the maximum frequency value 604 and the lower remaining frequency value 606) by the root mean square to determine the striation metric. According to some implementations, the maximum frequency value 604 is divided by the root mean square to determine the striation metric.

The method 1200 of FIG. 12 reduces manual labor associated with inspecting wire contacts, such as the wire contact 106, for crimped wires. For example, by determining the striation metric, the crimp inspection system 130 determines whether a wire is crimped with the wire contact 106 using an automated process. As a result, a relatively large number of wire contacts are inspected within a relatively short amount of time with decreased manual labor.

Figure 13:
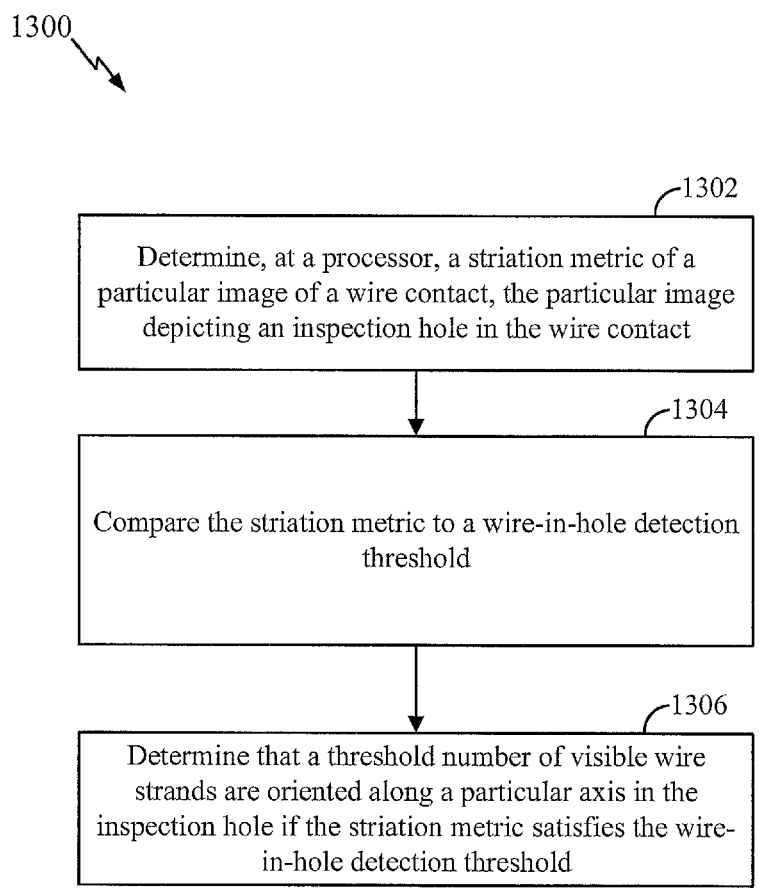
FIG. 13 is a method of inspecting a wire contact.

Referring to FIG. 13, a method 1300 of inspecting a wire contact is shown. The method 1300 may be performed by the system 100 of FIG. 1.

The method 1300 includes determining, at a processor, a striation metric of a particular image of a wire contact, at 1302. The particular image depicts an inspection hole in the wire contact. For example, referring to FIG. 1, the striation metric determination circuitry 137 determines the striation metric of the extracted image 128 of the wire contact 106. To illustrate, the striation metric determination circuitry 137 computes the summed complement of contact colors for the hole image, subtract the mean of the summed complement for the image to generate a resulting image. The striation metric determination circuitry 137 also computes the absolute value of the 2D FFT of the resulting image, zero the low frequencies (e.g., frequencies that fail to satisfy a threshold), and determine the difference between the maximum frequency content and the lowest remaining frequency value. The striation metric determination circuitry 137 divides the difference by the root mean square of the highest frequency quarter to determine the striation metric.

The method 1300 also includes comparing the striation metric to a wire-in-hole detection threshold, at 1304. For example, referring to FIG. 1, the comparison circuity 138 compares the striation metric to the wire-in-hole detection threshold.

The method 1300 also includes determining that a threshold number of visible wire strands are oriented along a particular axis in the inspection hole if the striation metric satisfies the wire-in-hole detection threshold, at 1306. For example, referring to FIG. 1, the crimp inspection system 130 determines that a threshold number of visible wire strands 104 are oriented along a particular axis in the inspection hole 108 if the striation metric is greater than wire-in-hole detection threshold. If the threshold number of wire strands 104 are determined to be present in the wire contact 106, the wire contact 106 is used to electrically connect different components of an electrical product together (via the wire strands). If the striation metric fails to satisfy the wire-in-hole detection threshold, the crimp inspection system 130 determines that fewer than the threshold number of visible wire strands 104 are oriented along a particular axis in the inspection hole 108 of the wire contact 106, and the wire contact 106 is rejected or subjected to additional inspections or tests.

The method 1300 of FIG. 13 reduces manual labor associated with inspecting wire contacts, such as the wire contact 106, for crimped wires. For example, visual optics (e.g., images) of the wire contact 106 are used in conjunction with a striation-based detection algorithm for automated crimp inspections. As a result, a relatively large number of wire contacts are inspected within a relatively short amount of time with decreased manual labor.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of inspecting a wire contact, the method comprising:
    receiving, at a processor from a sensor communicatively coupled to the processor, image data of a wire contact, the image data including a particular image of the wire contact, the particular image depicting an inspection hole in the wire contact;
    determining, at the processor, a striation metric of the particular image;
    comparing, at the processor, the striation metric to a wire-in-hole detection threshold; and
    determining, at the processor, that a threshold number of visible wire strands are oriented along a particular axis in the inspection hole if the striation metric satisfies the wire-in-hole detection threshold.

2. The method of claim 1, wherein determining the striation metric comprises:
    determining a plurality of complement values of contact colors in the particular image of the wire contact, each contact color corresponding to a pixel value of a particular portion of the wire contact in the particular image;
    determining a mean complement value of the plurality of complement values;
    subtracting the mean complement value from each pixel value in the particular image to generate a modified image;
    determining frequency values for each pixel of the modified image by computing an absolute value of a transform operation performed on the modified image; and
    determining the striation metric based at least on a maximum frequency value of the frequency values.

3. The method of claim 2, further comprising:
    identifying a particular portion of pixels in the modified image that have the highest frequency values;
    determining a root mean square of the frequency values in the particular portion; and
    dividing the maximum frequency value by the root mean square to determine the striation metric.

4. The method of claim 1, further comprising outputting a notice responsive to determining that the striation metric does not satisfy the wire-in-hole detection threshold.

5. The method of claim 1, further comprising:
    rotating the sensor around the wire contact;
    receiving, at the processor from the sensor, second image data of a wire contact, the second image data including a second particular image of the wire contact from a different angle than the particular image, the second particular image depicting an inspection hole in the wire contact;
    determining, at the processor, a second striation metric of the second particular image; and
    comparing the second striation metric to the striation metric, wherein the striation metric is compared to the wire-in-hole detection threshold responsive to the striation metric being greater than the second striation metric.

6. The method of claim 1, further comprising:
determining pixel values for each pixel of the wire contact in the image data;
determining a mean pixel value of the pixel values;
subtracting the mean pixel value from each pixel value in the image data to generate a first modified image;
performing a convolution operation on the first modified image and on a circular ring having a particular radius;
determining an inspection hole detection metric based on a minimum value of the convolution operation; and
extracting, at the processor, the particular image from the image data based on the inspection hole detection metric.

7. The method of claim 1, further comprising, prior to determining the striation metric, rotating the particular image to align a direction of a potential wire strand in the inspection hole with an image axis.

8. An apparatus for inspecting a wire contact, the apparatus comprising:
a sensor configured collect image data of a wire contact, the image data including a particular image of the wire contact, the particular image depicting an inspection hole in the wire contact;
striation metric determination circuitry configured to determine a striation metric of the particular image;
comparison circuitry coupled to the striation metric determination circuitry, the comparison circuitry configured to compare the striation metric to a wire-in-hole detection threshold; and
crimp inspection circuitry coupled to the comparison circuitry, the crimp inspection circuitry configured to determine that a threshold number of visible wire strands are oriented along a particular axis in the inspection hole if the striation metric satisfies the wire-in-hole detection threshold.

9. The apparatus of claim 8, further comprising:
complement value determination circuitry configured to determine a plurality of complement values of contact colors in the particular image of the wire contact, each contact color corresponding to a pixel value of a particular portion of the wire contact in the particular image;
average complement value determination circuitry coupled to the complement value determination circuitry, the average complement value determination circuitry configured to determine a mean complement value of the plurality of complement values;
a modified image generator coupled to the average complement value determination circuitry, the modified image generator configured to subtract the mean complement value from each pixel value in the particular image to generate a modified image; and
frequency value determination circuitry coupled to the modified image generator, the frequency value determination circuitry configured to determine frequency values for each pixel of the modified image by computing an absolute value of a transform operation performed on the modified image, wherein the striation metric is determined based at least on a maximum frequency value of the frequency values.

10. The apparatus of claim 9, wherein the striation metric determination circuitry is further configured to:
identify a particular portion of pixels in the modified image that have the highest frequency values;
determine a root mean square of the frequency values in the particular portion; and
divide the maximum frequency value by the root mean square to determine the striation metric.

11. The apparatus of claim 9, wherein the transform operation comprises a Fast Fourier Transform (FFT) operation.

12. The apparatus of claim 8, further comprising:
rotation circuitry configured to rotate the sensor around the wire contact, wherein the sensor is further configured to collect second image data of a wire contact, the second image data including a second particular image of the wire contact from a different angle than the particular image, the second particular image depicting an inspection hole in the wire contact, and wherein the striation metric determination circuitry is further configured to determine a second striation metric of the second particular image; and
striation maximum metric circuitry configured to compare the second striation metric to the striation metric, wherein the comparison circuitry is configured to compare the striation metric to a wire-in-hole detection threshold responsive to the striation metric being greater than the second striation metric.

13. The apparatus of claim 12, further comprising inspection hole detection circuitry configured to:
determine pixel values for each pixel of the wire contact in the image data;
determine a mean pixel value of the pixel values;
subtract the mean pixel value from each pixel value in the image data to generate a first modified image;
perform a convolution operation on the first modified image and on a circular ring having a particular radius;
determine a inspection hole detection metric based on a minimum value of the convolution operation; and
extract the particular image from the image data based on the inspection hole detection metric.

14. The apparatus of claim 8, further comprising rotation circuitry configured to rotate the particular image to align a direction of a potential wire strand in the inspection hole with an image axis.

15. A non-transitory computer-readable medium comprising instructions for inspecting a wire contact, the instructions, when executed by a processor, cause the processor to perform operations comprising:
receiving, from a sensor, image data of a wire contact, the image data including a particular image of the wire contact, the particular image depicting an inspection hole in the wire contact;
determining a striation metric of the particular image;
comparing the striation metric to a wire-in-hole detection threshold; and
determining that a threshold number of visible wire strands are oriented along a particular axis in the inspection hole if the striation metric satisfies the wire-in-hole detection threshold.

16. The non-transitory computer-readable medium of claim 15, wherein the operations further comprise:
determining, at a processor, a plurality of complement values of contact colors in the particular image of the wire contact, each contact color corresponding to a pixel value of a particular portion of the wire contact in the particular image;
determining a mean complement value of the plurality of complement values;
subtracting the mean complement value from each pixel value in the particular image to generate a modified image;

determining frequency values for each pixel of the modified image by computing an absolute value of a transform operation performed on the modified image; and determining the striation metric based at least on a maximum frequency value of the frequency values.

17. The non-transitory computer-readable medium of claim 16, wherein the operations further comprise:

identifying a particular portion of pixels in the modified image that have the highest frequency values;

determining a root mean square of the frequency values in the particular portion; and dividing the maximum frequency value by the root mean square to determine the striation metric.

18. The non-transitory computer-readable medium of claim 16, wherein the transform operation comprises a Fast Fourier Transform (FFT) operation.

19. The non-transitory computer-readable medium of claim 15, wherein the operations further comprise extracting the particular image from a first image of the wire contact based on an inspection hole detection metric.

20. The non-transitory computer-readable medium of claim 19, wherein the operations further comprise:

determining pixel values for each pixel of the wire contact in the first image;

determining a mean pixel value of the pixel values;

subtracting the mean pixel value from each pixel value in the first image to generate a first modified image; and performing a convolution operation on the first modified image and on a circular ring having a particular radius; and determining the inspection hole detection metric based on a minimum value of the convolution operation.

21. A wire crimp inspection system comprising:

a sensor configured to generate at least one image of a wire contact;

a processor configured to:

identify a location of an inspection opening in the at least one image;

identify a quantity and orientation of any wires visible in the inspection opening in the at least one image; and generate a notice when a threshold number of wires are oriented along a particular axis in the inspection opening.

22. The wire crimp inspection system of claim 21 further comprising rotation circuitry configured change a relative position of the sensor and the wire contact until the sensor captures an image depicting the inspection opening.

* * * * *